June 3, 1924.                                                1,496,411
J. FRANK
PEANUT BLANCHING MACHINE AND METHOD
Filed Dec. 6, 1923                    4 Sheets-Sheet 3

Witness:

Inventor:
Julius Frank.
By Wilkinson Huxley Byron & Knight
Attys

June 3, 1924.
J. FRANK
PEANUT BLANCHING MACHINE AND METHOD
Filed Dec. 6, 1923  4 Sheets-Sheet 4
1,496,411
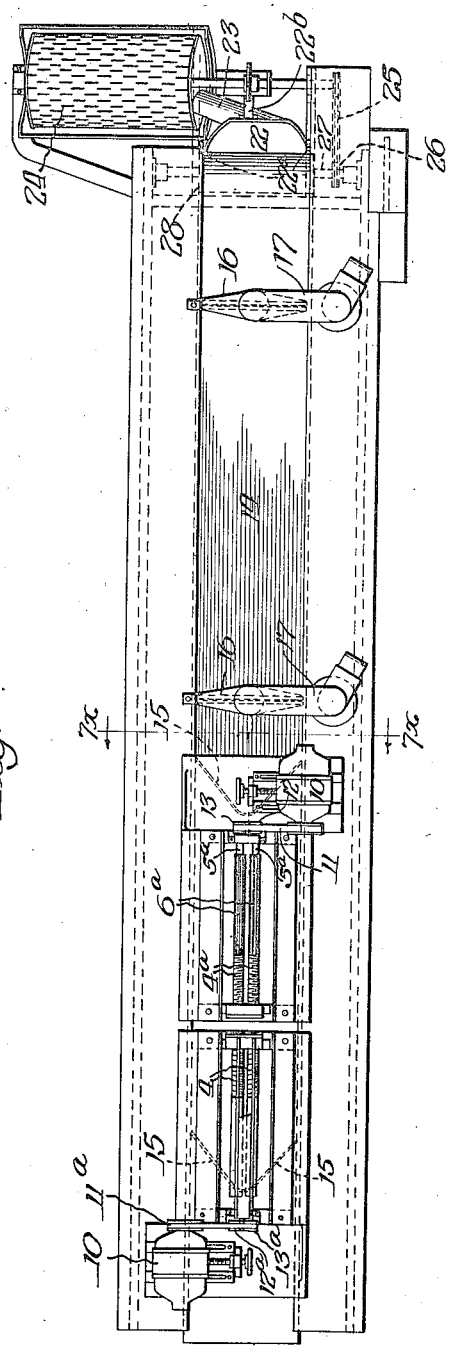
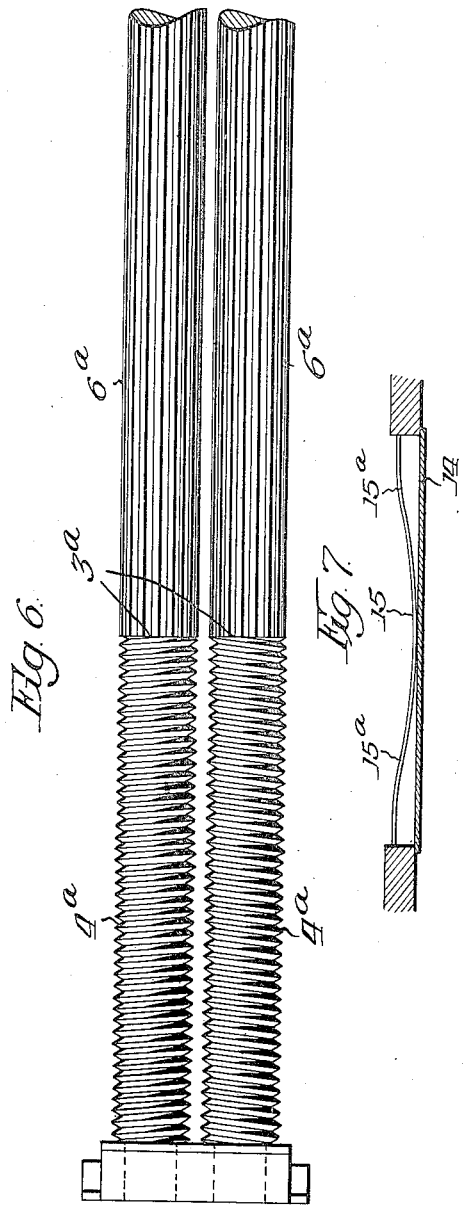
Witness:
Inventor:
Julius Frank.

Patented June 3, 1924.

1,496,411

UNITED STATES PATENT OFFICE.

JULIUS FRANK, OF CHICAGO, ILLINOIS.

PEANUT-BLANCHING MACHINE AND METHOD.

Application filed December 6, 1923. Serial No. 678,846.

*To all whom it may concern:*

Be it known that I, JULIUS FRANK, a citizen of the United States, residing at Chicago, in the county of Cook and State of Illinois, have invented certain new and useful Improvements in Peanut-Blanching Machines and Methods, of which the following is a specification.

This invention relates to the blanching of nuts, for instance, peanuts, after their shells have been removed, by removing the skin that immediately adheres to the kernel, and particularly to blanching by feeding the kernels through a closed channel in contact with an abrading element. It has been proposed to blanch nuts in this way by passing their kernels through an approximately horizontal trough, the bottom of which is formed by a roll or rolls fluted to develop abrading surfaces, the rolls being revolved oppositely and in directions which tend to lift the nuts from the bottom of the trough and keep the mass changing as it traverses the trough, so that the nuts are brought successively against the abrading surfaces. An example of such a machine is found in United States Letters Patent No. 1,228,103, issued May 29, 1917, upon the invention of Joseph A. Franklin.

One object of the present invention is to improve the procedure described in a manner that will greatly increase the volume and quality of results obtained in the procedure described; and one part of the present invention consists in passing the nuts in mass through the channel at a rate of feed that causes them to press firmly against the abrading element and against one another, as by maintaining a head of pressure by a column of nuts standing over the receiving end of the channel and exerting a feeding influence upon the bottom of the mass at such end, as by forming coarse feeding threads upon the receiving ends of the rolls and imparting a high rate of speed to the abrading rolls; an upper confining wall for the channel being provided in conjunction with the side walls, which holds the mass of nuts in a crowded state upon the abrading rolls and against one another, thereby developing an abrading action very much greater than that resulting from mere gravity of the mass. The length of the abrading surfaces is increased over prior practice; and the nuts are permitted to escape laterally of the rolls as well as vertically between them when they reach the discharge ends thereof. The nuts are discharged upon and automatically spread over a relatively broad endless belt by which they are conveyed, in spread out condition, past suction nozzles which withdraw the detached skins, and being then passed preferably through a separator which separates the whole from the half kernels. At the suction nozzles the nuts are temporarily interrupted by means of obstacles, preferably in the form of stationary wires extending transversely across the belt at a height which interrupts the free passage of the nut, but which is not sufficient to prevent the nut being hurdled over the wire by nuts coming behind it.

Another object of the invention is to provide an advantageous arrangement of duplicate blanching units simultaneously fed from the hopper or other source, and acting simultaneously upon the masses of nuts fed to them, but discharging upon a common conveying belt at points spaced apart in the direction of travel of the belt; and, to this end, further features of the invention consists in arranging a plurality of abrading units having the several structural features already described, with their directions of feed extending in opposite directions so that they can receive nuts from the same hopper bottom, and their deposits upon the single belt will be at points sufficiently in advance one of the other to permit the first deposit to be distributed over the belt to such an extent that when the traveling deposit is added to by the deposit of the second unit, the belt will be substantially covered but with only a single layer, so that hand pickers will have ample opportunity to observe the character of the work and remove imperfect nuts, foreign matter, etc.

Still another object of the invention is to provide an improved form of separator which is especially adapted for use in connection with blanching apparatus of the kind herein described; and, to this end, a further feature of the invention consists in providing at the end of the conveyor belt a funnel-like collector into which the nuts are deposited, a spout delivering in an approximately horizontal direction from said collector and a cylindrical screen receiving nuts from the spout and having perforations which pass the halves of the kernels while retaining the whole kernels; the collector being trunnioned or otherwise mounted with freedom of oscillation, and provided with an arm which rests upon a star wheel through which it is jarred or agitated, and the screening cylinder being driven at substantially the same surface speed as that of the endless belt.

The invention consists in the features of novelty hereinafter pointed out in the claims.

In the accompanying drawings, in which the preferred embodiment of the invention is shown by way of illustration—

Figure 5 is a plan view of the complete machine on a reduced scale, the supply hopper being omitted.

Figure 6 is a plan view of a portion of the abrading rolls, and including the spirally dressed feeding ends thereof; and Figure 7 is a detail view showing the relation of the spreader to the feeding apron.

Figure 1:
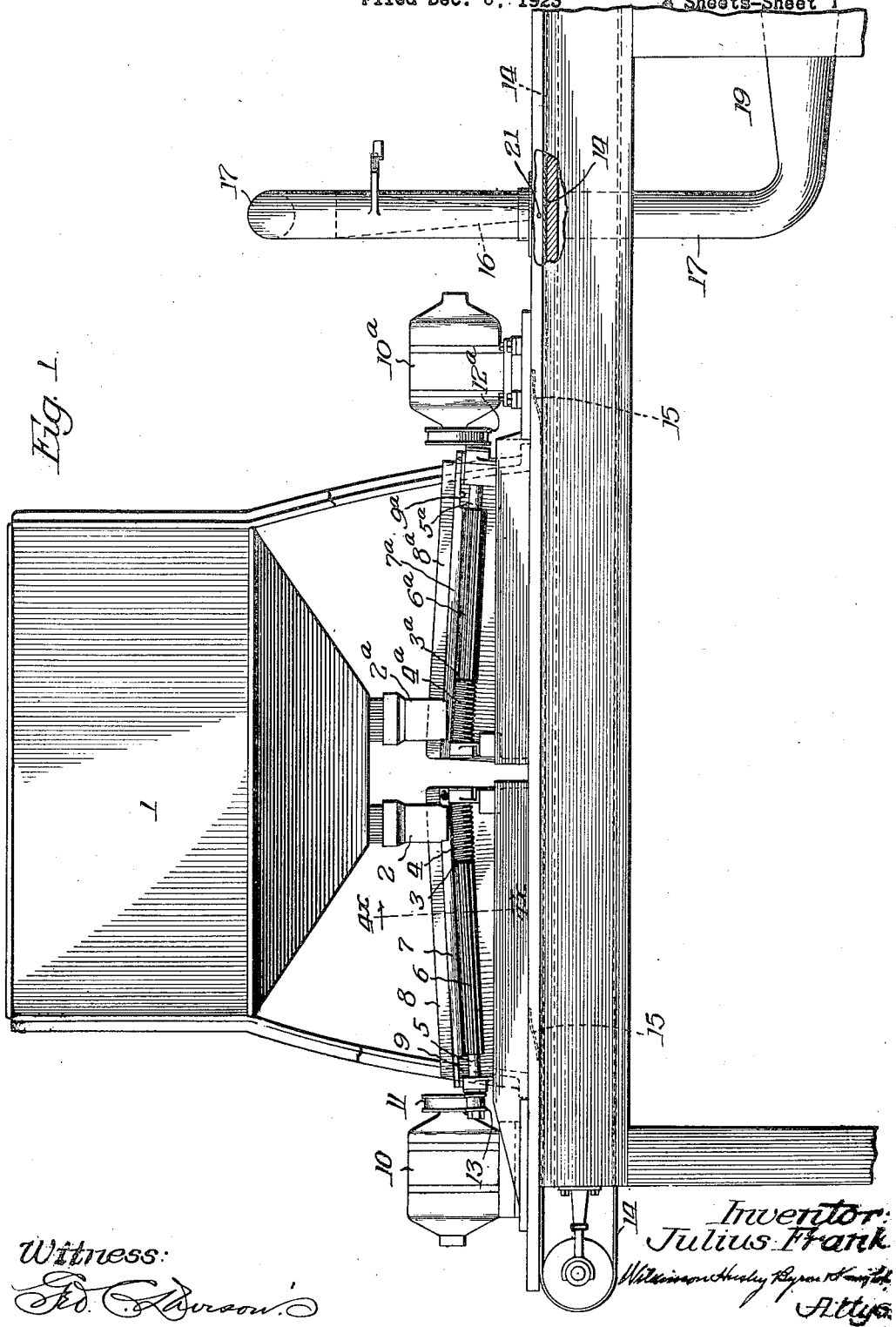
Figures 1 and 2 show collectively a side elevation of the complete machine, Figure 1 showing the end of the machine with the duplicate abrading units and one of the skin suction nozzles, and Figure 2 showing the discharge end of the machine, together with the other skin suction nozzle and the screening apparatus.

1 represents a hopper adapted to contain peanuts or other kernels after removal from their shells, but before removal of their immediate enveloping skins, and 2, 2 represent delivery spouts depending from said hopper and directing the contents of the hopper in a manner, if desired, to develop feeding pressure upon the column of material passing therethrough. 3 represents blanching rolls mounted in a pair or pairs and in a relation to constitute the bottom of the trough into which a spout 2 will deliver, and through which nuts may slowly flow under feeding influences, such, for instance, as coarse threads 4 at their receiving ends, augmented by the head or pressure of nuts standing in the feed spout 2, and the slight inclination of the rolls toward their discharge ends 5. Between the spiral or threaded receiving end 4 and the discharge ends 5, the rolls 3 are constructed with blanching surfaces, preferably in the form of flutings 6, which are generally arranged parallel with the axis of the roll. Side walls 7 and a cover 8 form with the rolls a closed trough through which the nuts are caused to travel, and in which they are crowded together and confined, with the dual effect of providing a substantial mass against which the feeding influences may act in causing the column to pass through the trough, and holding the lower stratum of nuts against the abrading surfaces of the rolls. In acting upon the mass, the blanching surfaces roll the nuts to bring constantly changing portions of their surfaces under the abrading or cutting influence, and gradually displace the lower stratum of nuts outward and upward so as to permit overlying nuts to pass downward toward the space between the rolls and to gradually come into contact with the rolls. The discharge ends 5 of the rolls are sufficiently reduced in diameter to permit the nuts to escape from the rolls, and to further facilitate such escape, the side walls 7 are provided with recesses 9. The result of this construction of the discharge end of the blanching element, as will be appreciated by comparing Figures 1 and 5, is to permit the nuts to pass not only downwardly between the reduced ends 5 of the rolls but laterally through the discharge spaces 9.

Important features in the construction of the blanching element, according to the present invention, are that the feeding screws or threads 4 are made relatively coarse so that the convex surfaces of the kernels can drop to a substantial degree into the spaces between the threads and receive a stronger feeding influence; the relation of the length of the threaded portion to the blanching portion of the roll is about 1 to 3; and the discharge end is relatively short axially. The rolls 3 are driven at a high rate of speed, say, about 5500 per minute, which is conveniently accomplished by coupling them with an electric motor 10 through means of a belt 11 which passes over the pulley 12 on one roll and around the pulley 13 on the other roll.

In addition to the blanching element composed of parts numbered from 3 to 13, or their equivalents, as above described, I prefer to employ a second blanching element of identical construction, parts of which are similarly numbered with the exponent "a," to-wit: comprising rolls $3^a$ having feed screws $4^a$, reduced discharging ends $5^a$, fluted blanching surfaces $6^a$, side walls $7^a$, and cover $8^a$ forming with the blanching rolls a closed trough through which the nuts are forced by feeding influences, as described, and discharge recesses $9^a$; such element being driven by the motor $10^a$ through a belt $11^a$ and pulleys $12^a$, $13^a$. But the blanching element last described extends in a direction opposite to that of the element first described, so that it deposits the blanched nuts at a point remote from the point of deposit of the first unit, and this deposit being upon an endless feeding apron 14, permits the nuts to be spread or discharged over the apron from one feeding point before reaching the discharge point of the second blanching element, with the result that the combined deposits of the two elements substantially cover the apron and greatly facilitate subsequent steps in the blanching process.

In order to distribute the nuts issuing from the blanching element, a deflector consisting of a fine rod or wire 15 is employed, and which consists of a pair of arms diverging from the longitudinal center line of the machine rearwardly and outwardly in substantially the form of a V, so that the nuts which are deposited more thickly along the middle line of the apron will be deflected laterally; and in order that the nuts may not be crowded too much to the sides of the apron, said deflector 15 is bent upwardly, as shown at 15$^a$ in Figure 7, to gradually increase its distance from the apron 14 and permit the nuts to escape beneath it.

The blanched nuts and dislodged or partially dislodged skins deposited upon the apron 14, pass beneath suction nozzles 16 which are reduced in the direction of travel of the apron, but extended transversely thereto, so that they substantially correspond to the width of the apron, and these nozzles are subject to air suction through pipes 17, 18, and 19 leading to exhaust fan 20. In order to facilitate the separation by suction of the dislodged skins as they pass beneath the nozzles 16, obstacle wires 21 are fixedly stationed across the apron 14 immediately beneath the nozzles, and these obstacles are of such dimension that the nuts strike against them and are temporarily arrested, but hurdle over them as they are crowded by nuts from behind, and in so acting bring the skins under more direct influence of the separating nozzles. Preferably a plurality of these nozzles are used; two are shown in the drawing acting successively upon the material that is being forwarded by the apron, but one such nozzle or more than two thereof may be used if desired.

Apron 14 discharges the blanched nuts into a funnel 22 having a spout 23 delivering into a screen 24 which is driven by a belt 25 from pulley 26 on the shaft 27 of the rear roller 28 of apron 14. By this means the surface speed of the screen 24 is coordinated with that of the apron 14 and of the blanching units, and the screen thus adapted to sift the blanched nuts as rapidly as they are delivered from the apron. The perforations in the screen 24 are so designed that they will permit the escape through the wall of the screen of half peanuts, when the machine is used for blanching peanuts, or fragments of nuts as distinguished from whole pieces, and the two products thus separated will be delivered into separate receptacles.

Figure 2:
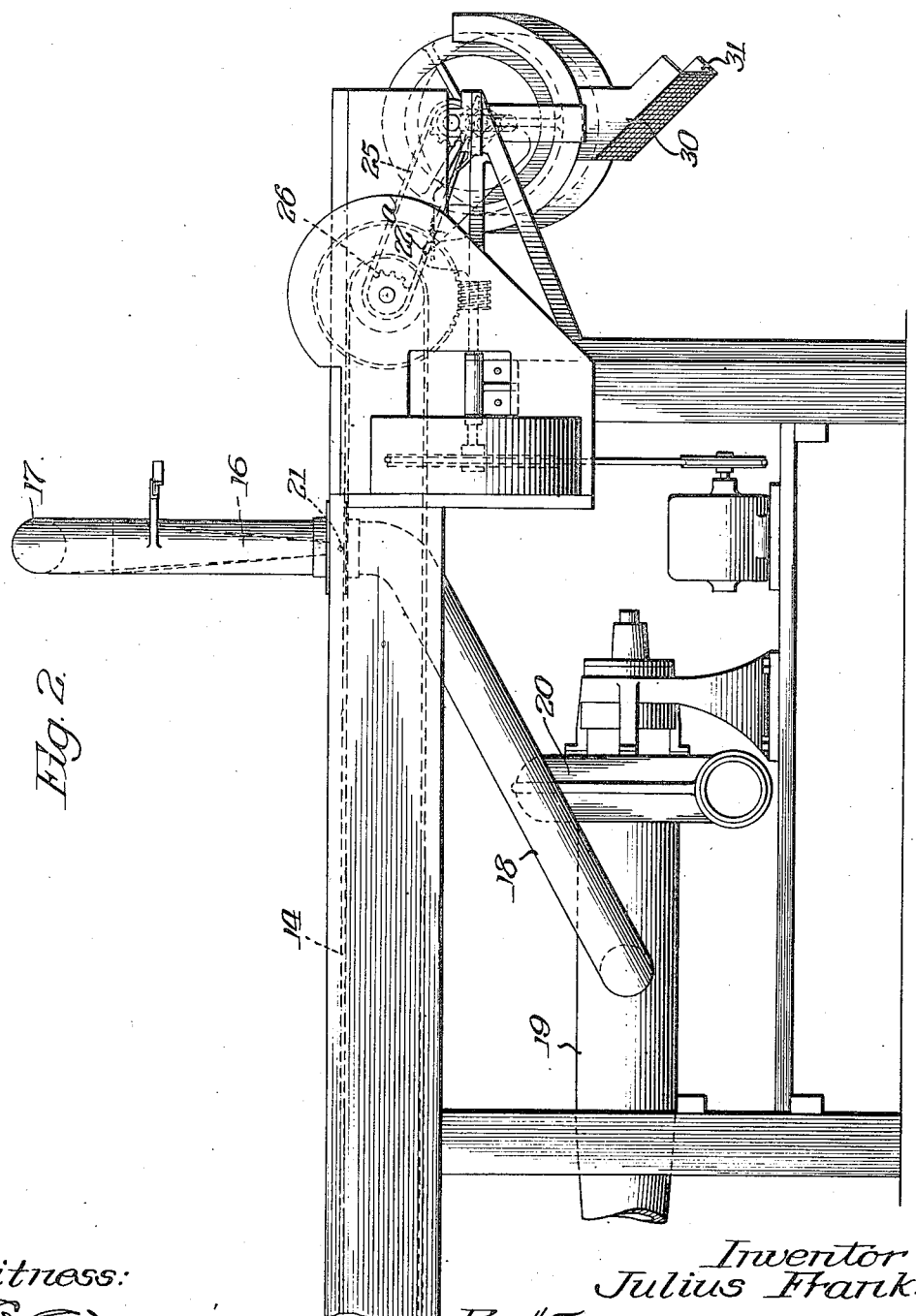
Figure 3:
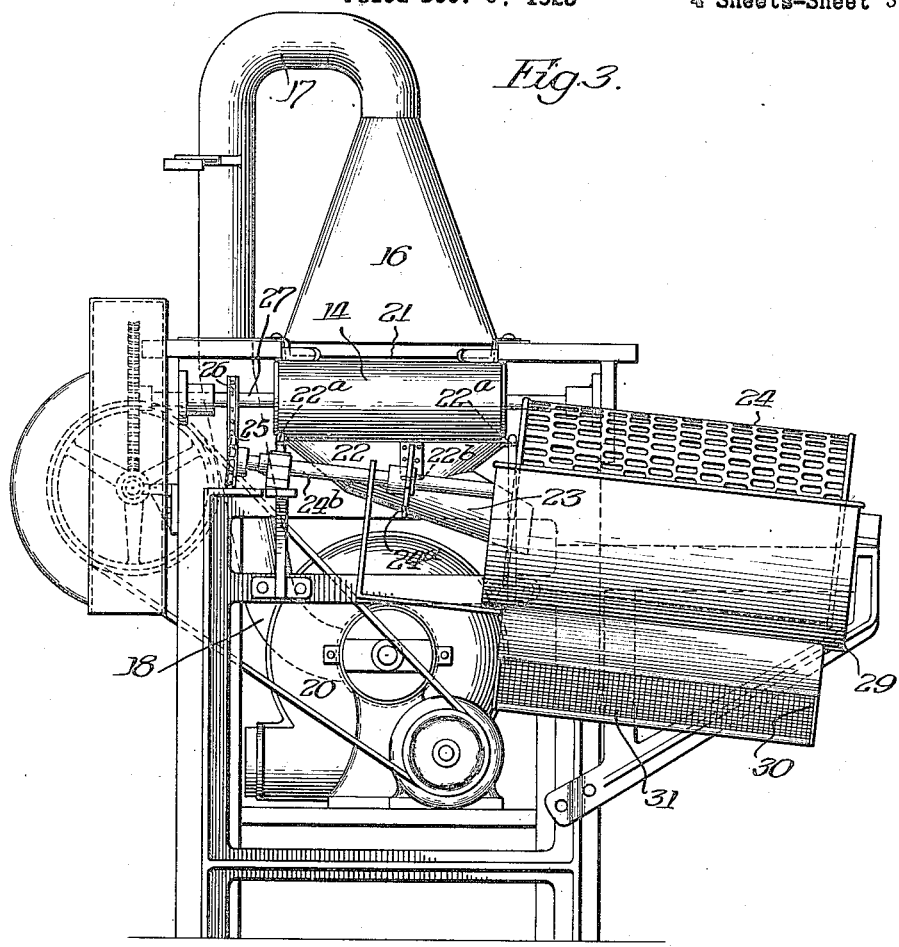
Figure 3 is an end elevation of the machine as seen from the discharge and screening end thereof.

As shown in Figure 3, the screen 24 is mounted on an inclined axis so that the nuts not passing through its mesh escape at the point 29 where they may drop into a receptacle placed on the floor beneath such point, and fragments passing through the mesh of the screen drop into a chute 30 (Figures 2 and 3), the bottom of which is screened with a mesh sufficiently fine to permit the escape of dust and fragments of skin, while the nut fragments to be saved escape at the point 31 into a receptacle provided to receive them. It is desirable to agitate the whole and half kernels as they pass through the funnel 22, and for that reason said funnel is trunnioned at 22$^a$ and carries a finger 22$^b$ that rests upon a star wheel 24$^a$ on the shaft 24$^b$ of the screen 24.

Figure 4:
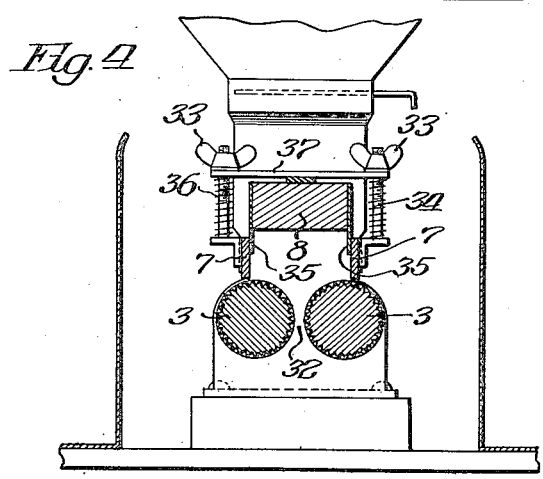
Figure 4 is a section on the line $4^x$—$4^x$ of Figures 1 and 5.

As shown in Figure 4, the blanching rolls 3 are preferably arranged with a space 32 between them which is gauged too small to permit merchantable nuts or fragments of nuts to pass, but will nevertheless permit the discharge of foreign matter. It will also be seen that the cover 8 of the trough, through which the nuts are forced, is adjustably supported with relation to the rolls through means such as wing-nuts 33 on screws 34, said cover being provided with flanges 35 which meet and overlap with the side walls 7 of the trough, and springs 36 being used to support the said cover at the exact level to which it may be forced by the wing nuts, said cover being preferably supported through the medium of a cross bar or yoke 37, as shown. The effect of this arrangement is to permit the mass of nuts forced through the trough to be regulated to a nicety in proportion to the pressure that is required to insure dislodgment of the skins from the kernels without abrading and consequently wasting the material of the kernel itself. This is particularly important when blanching peanuts, where it is desirable to retain the nut in complete form and to avoid separation into its constituent halves as much as possible in the blanching process. If the nuts are crowded too closely together, the separation of their halves or otherwise breaking of the nuts is greatly increased. And if the pressure be too light, as when the transverse area of the trough is too large for the rate of feed, there is not sufficient pressure against the blanching rolls to insure dislodgment of the skins. It is also important to properly correlate the rate of feed, the sectional area of the trough, and the length of the abrading surfaces of the rolls in order that all of the nuts will be treated in their passage through the blanching element, and this is best accomplished by selecting approximate dimensions at the outset and then regulating by changing the sectional area of the trough, which is rendered very convenient and accurate by the means here described. It should be noted that the included angle of the fluting or ribs forming the abrading surface is about 55°, which has been found by experiment to give the best results in cutting the skin without wasting the substance of the nut, and in rolling and displacing the nut in a manner to insure thoroughness of action.

I claim:

1. In a nut blanching machine, a plurality of blanching elements, a common conveyor apron upon which said elements deliver at points spaced apart in the direction of travel of the apron, and a separator to which all of said products are subjected by said apron.

2. In a nut blanching machine, a plurality of blanching elements, a common conveyor apron upon which said elements deliver at points spaced apart in the direction of travel of the apron, and a separator to which all of said products are subjected by said apron; there being associated with said apron, intermediately of the points at which the respective blanching elements deliver, a spreader that spreads the nuts delivered by one element prior to the deposit from the other element.

3. In a nut blanching machine, a plurality of blanching elements through which nuts to be blanched are fed, said blanching elements being arranged in opposite directions so that they respectively discharge at points remote from each other, and a common conveying means for both said elements.

4. In a nut blanching machine, a plurality of independent blanching elements separately acting upon material supplied thereto, a common conveyor means receiving material from both said elements, and a spreader for distributing such material with relation to the conveyor means.

5. In a nut blanching machine, a blanching element, comprising a roll constructed with a relatively coarse feeding thread at the receiving end of said roll, and an abrading surface upon the portion of the roll toward which the thread feeds, extending over a portion of the length of the roll which is substantially greater than that covered by the feeding thread; said roll having beyond said abrading surface in the direction of feed, a portion of reduced diameter which facilitates escape of the nuts after leaving the abrading surface.

6. In a nut blanching machine, a blanching element, comprising a feeding roll, and parts including sides and a cover forming with said roll a closed trough through which nuts to be blanched are caused to travel; said cover being resiliently supported over the roll and having means for adjustably limiting its distance from the roll.

7. In a nut blanching machine, a blanching element, a conveyor apron upon which said blanching element discharges, and a spreader over said conveyor apron, comprising an approximately V-shaped element with its apex presented in the direction from which the nuts are fed by the apron.

8. In a nut blanching machine, a blanching element, a conveyor apron upon which said blanching element discharges, and a spreader over said conveyor apron, comprising an approximately V-shaped element with its apex presented in the direction from which the nuts are fed by the apron; said spreader having its said apex spaced from the apron a distance less than the thickness of the nut.

9. In a nut blanching machine, a blanching element, a conveyor apron upon which said blanching element discharges, and a spreader over said conveyor apron, comprising an approximately V-shaped element with its apex presented in the direction from which the nuts are fed by the apron; said spreader having its said apex spaced from the apron a distance less than the thickness of the nut, and having its divergent arms increasing in distance from the apron.

10. In a nut blanching machine a blanching element, a traveling apron receiving nuts from said blanching element, a suction funnel in position to draw skins from the product of the blanching element as they are advanced by the apron, and an obstacle overlying the apron adjacent said funnel and agitating the nuts and skins as they reach the latter.

11. In a nut blanching machine, a blanching element, a traveling apron receiving nuts from said blanching element, a suction funnel in position to draw skins from the product of the blanching element as they are advanced by the apron, and an obstacle overlying the apron adjacent said funnel and agitating the nuts and skins as they reach the latter; said obstacle comprising a wire parallel with the surface of the apron and in position to cause the nuts to hurdle over it as they are fed.

12. In a nut blanching machine, a blanching element, a conveyor apron, a funnel receiving material from said apron, and an agitator acting upon said funnel.

13. In a nut blanching machine, a blanching element, an apron receiving nuts from said blanching element, a funnel pivotally supported in position to receive nuts from said apron, an agitator for said funnel comprising a star wheel, and a finger on said funnel cooperating with said star wheel.

14. In a nut blanching machine, a blanching element, an endless apron receiving nuts from said blanching element, a roll around which said apron travels, a revolving cylinder screen to which nuts are delivered from the apron, and a positive drive from the apron roll to said screen maintaining a definite ratio of surface travel in the apron and screen.

15. The method of blanching nuts, which consists in crowding the nuts, in mass, through a closed channel, one confine of which comprises a skin cutting element, the nuts being thereby kept under pressure and in contact with said skin cutting element, and simultaneously acting upon the nuts by said skin cutting element in a direction that forces the nuts contiguous to said element inward relatively to the mass, constantly brings new nuts under the influence of said element, and thereby develops rubbing together of the nuts.

16. The method of blanching nuts, which consists in crowding the nuts, in mass, through a closed channel, and during their passage therethrough acting upon the mass along one confine of the channel through the medium of skin cutting elements and in a direction which is inward toward the mass of nuts, and at the same time sustaining the opposite confine of the channel resiliently.

Signed at Chicago, Illinois, this 4th day of December, 1923.

JULIUS FRANK.